United States Patent [19]

Lucia

[11] Patent Number: 4,592,228

[45] Date of Patent: Jun. 3, 1986

[54] TRANSMISSION TESTER

[76] Inventor: Carroll J. Lucia, 2703 Bay Settlement Rd., Green Bay, Wis. 54301

[21] Appl. No.: 678,101

[22] Filed: Dec. 4, 1984

Related U.S. Application Data

[63] Continuation-in-part of Ser. No. 493,301, May 10, 1983, Pat. No. 4,520,659.

[51] Int. Cl.⁴ ............................................. G01M 13/02
[52] U.S. Cl. ....................................................... 73/118
[58] Field of Search ............. 73/116, 118, 862, 862.09

[56] References Cited

U.S. PATENT DOCUMENTS

| | | | |
|---|---|---|---|
| 3,016,740 | 1/1962 | Raidl | 73/118 |
| 3,075,381 | 1/1963 | Lelis | 73/118 |
| 4,391,131 | 7/1983 | Scourtes | 73/118 |
| 4,520,659 | 6/1985 | Lucia et al. | 73/118 |

Primary Examiner—Stewart J. Levy
Assistant Examiner—Robert R. Raevis
Attorney, Agent, or Firm—Hauke & Patalidis

[57] ABSTRACT

A transmission testing apparatus having at least one inertia flywheel having a shaft capable of being coupled to the output shaft of the transmission being tested. The transmission is mounted on a removable plate on one side of an adjustable bulkhead supporting an internal combustion engine on the other side. The engine has an output shaft coupled to the input shaft of the transmission. The bulkhead is pivotally and adjustably positionable such as to align the transmission output shaft with the inertia flywheel shaft. The engine is maintained in an appropriate upright normal position providing correct carburetion and lubrication by being supported by a mounting plate rotatable relative to the bulkhead and held in substantially the same angular position relative to horizontal and vertical reference axes, irrespective of the position of the bulkhead, by a strut pivotally attached to the engine mounting plate at one end and pivotally attached to the support base of the apparatus at its other end. Alternatively, the bulkhead is supported by pivotable legs forming a deformable parallelogram, with the result that the engine is held in substantially the same angular position irrespective of the position of the bulkhead.

36 Claims, 13 Drawing Figures

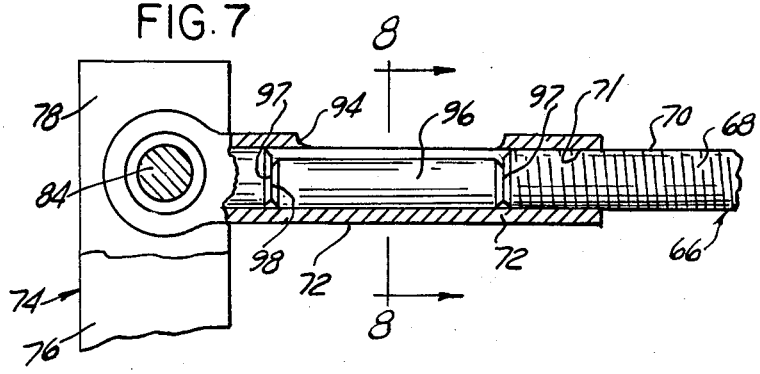
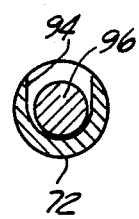
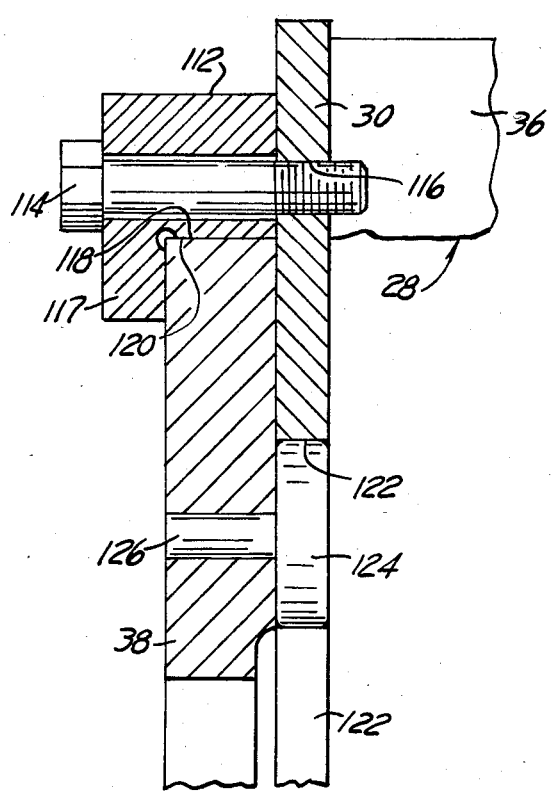
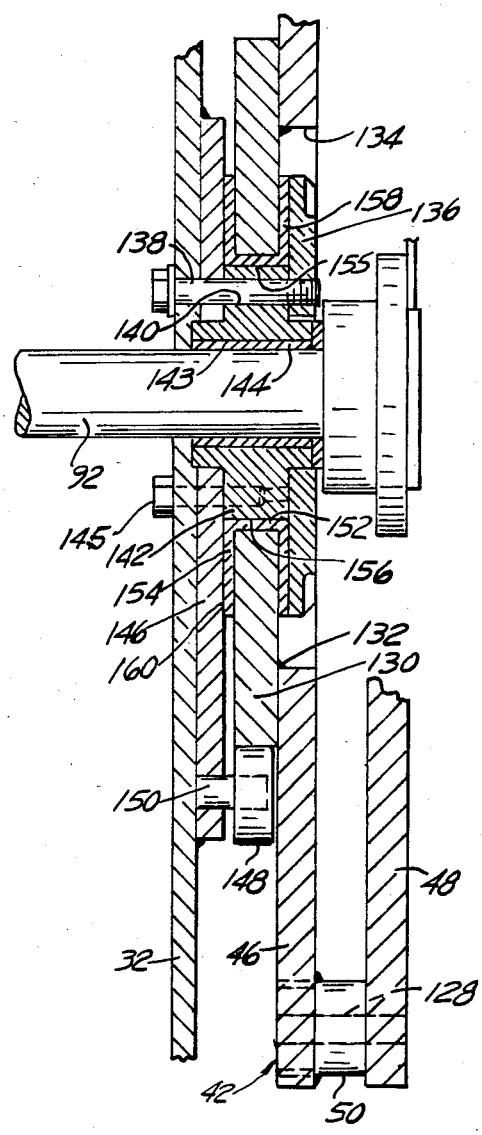

TRANSMISSION TESTER

CROSS-REFERENCE TO RELATED APPLICATION

The present application is a continuation-in-part of application Ser. No. 493,301, filed May 10, 1983, now U.S. Pat. No. 4,520,659.

BACKGROUND OF THE INVENTION

The present invention belongs to the field of prime mover tester apparatus and methods, in general, and more particularly the present invention relates to motor vehicle automatic transmission testers.

It is common practice to test factory assembled transmissions before installation in motor vehicles. However, although it would be desirable to also test transmissions repaired in service shops and garages, and transmissions rebuilt by transmission rebuilders, test stands for testing repaired or rebuilt transmissions are not generally available in view of the high cost of such testing equipment, and more particularly of highly instrumented testing equipment of the dynamometer or brake type. Dynamometers and like apparatus are costly and delicate, often difficult to maintain in good operating condition, and they require substantially skilled personnel for proper operation, interpretation of test data, and maintenance.

Applicant has in the past developed testing equipment for prime movers, such as internal combustion engines, and automotive transmissions, as disclosed in U.S. Pat. Nos. 3,060,730, 3,505,863, and 3,592,053, utilizing the simple principle of coupling the prime mover or transmission output to a flywheel of known inertia which is driven and accelerated to a predetermined velocity. When used for testing an automatic transmission, for example, during acceleration the torque performance of the transmission output can be determined, and proper shifting of gears from low to high gear simulated as would be the case with the transmission mounted in a motor vehicle during normal acceleration in an actual road test. During deceleration, the energy stored in the flywheel is used to drive the prime mover through the transmission as would be the case in actual use on the road, such as to provide appropriate testing of the downshift operation of the transmission from high speed to complete stop.

With the recent advent of front-wheel drive motor vehicles utilizing a transaxle type of transmission, additional problems have been brought to light in view of the structural arrangement of such transaxle transmissions having an input shaft and two output shafts, each output shaft driving one of the front wheels of the motor vehicle as compared to "conventional" automatic transmissions of the type used for rear-wheel drive motor vehicles, which are provided with an input shaft and a single output shaft, generally aligned along a common centerline or having substantially parallel centerlines. Testing of transaxle transmissions by way of the inertia flywheel technique on a universal test stand requires that means be provided for aligning the input shaft of the transmission with the output shaft of a prime mover, such as an electric motor or preferably an internal combustion engine permanently mounted on the test stand, and for aligning each of the output shafts with one of the inertia flywheel shafts for coupling to the inertia flywheel shafts. Because there is a multitude of different mounts for transaxle transmissions of different makes and models, the problem of proper shaft alignment is further complicated.

The invention disclosed in co-pending application Ser. No. 493,301, now U.S. Pat. No. 4,520,659 provides a test stand for automatic transmissions, more particularly permitting alignment of the transmission input shaft and output shafts respectively with the prime mover output shaft and with the energy absorbing shafts on the test stand, in a simple and precise manner. The invention, in one of its aspects, provides a universal type of transmission testing stand capable of accepting for test straight-through transmissions as well as transaxle transmissions.

Preferably, the prime mover is an internal combustion engine which simulates more realistically than an electric motor actual conditions of operation of the transmission tested on the test stand. The transmission testing apparatus disclosed in the co-pending application comprises a pivotable bulkhead supporting the internal combustion engine having an output shaft coupled to the input shaft of the transmission. The bulkhead is pivotably supported from the base frame of the testing apparatus for alignment of the transmission output shaft with an inertia flywheel shaft while testing straight-through transmissions, and for alignment of the output shafts each with an inertia flywheel shaft when testing transaxle transmissions. More particularly when testing transaxle transmissions, positioning of the bulkhead for proper alignment may result in the internal combustion engine being disposed at an angle which may interfere with proper cooling of the engine, correct carburation and normal lubrication of the engine moving parts as a result of continuous operation at a slant angle that may hinder correct operation of constant level carburetors and unport the lubrication pump inlet line.

SUMMARY OF THE INVENTION

The present invention provides a test stand for automatic transmissions which is an improvement on that disclosed in the co-pending application as a result of providing proper vertical positioning of the internal combustion engine prime mover mounted on the pivotal bulkhead, irrespective of the position adjustment of the bulkhead about its center of pivoting. In addition, the present invention provides precise and accurate adjustment of the position of the bulkhead by means of interchangeable spacers, each adapted to provide precise shaft alignments for one or more transmission types or models.

The many objects and advantages of the present invention will become apparent to those skilled in the art when the following description of the best modes contemplated at the present for practicing the invention is read in conjunction with the accompanying drawings, wherein like reference numerals refer to like or equivalent parts, and in which:

BRIEF DESCRIPTION OF THE DRAWINGS

FIG. 7 is a partial section along line 7—7 of FIG. 4;

FIG. 8 is a cross-section along line 8—8 of FIG. 7;

FIG. 9 is a partial section along line 9—9 of FIG. 5;

FIG. 10 is a partial section along line 10—10 of FIG. 3;

DETAILED DESCRIPTION OF THE PREFERRED EMBODIMENTS

Figure 1:
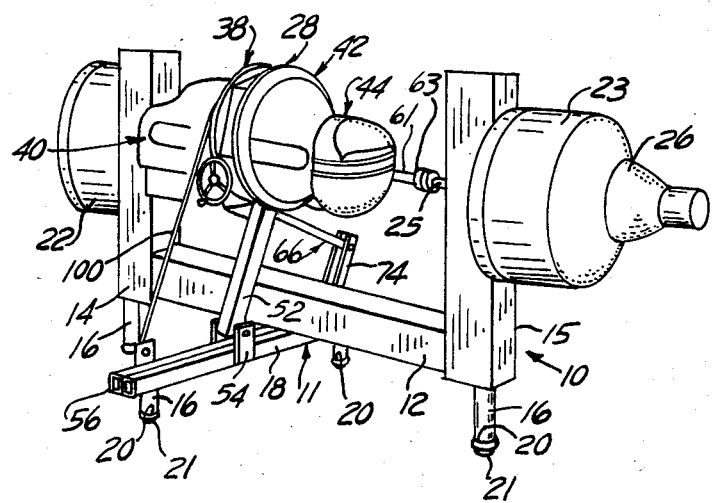
FIG. 1 is a perspective front view of an automatic transmission test apparatus according to the present invention, particularly suitable for testing transaxle transmissions.
Figure 2:
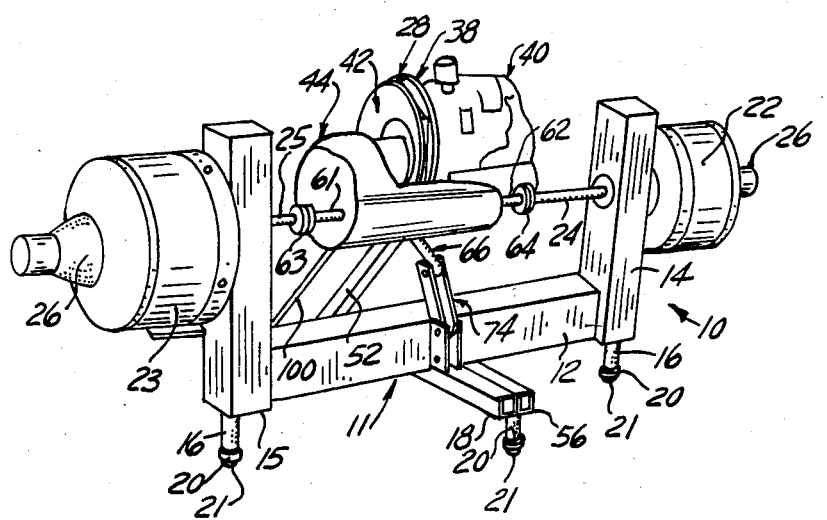
FIG. 2 is a rear perspective view thereof.

Referring now to the drawings, and more particularly to FIGS. 1 and 2, a transaxle transmission testing apparatus 10 according to the present invention comprises a rigid support structure or base 11 consisting of a longitudinally extending closed channel frame member 12 provided at each end with an upright post, 14 and 15, and with a height adjustable ground supporting foot 16. A transversely extending beam or leg 18 is fastened to the longitudinal frame member 12, such as by being welded or bolted below the longitudinal frame member 12. The transverse beam or leg 18 is provided at each end with a height adjustable foot 20. Each of the feet 16 and 20 has a pad 21 made of elastomeric material, such as rubber, in engagement with the ground for the purpose of absorbing vibration. Preferably, and as shown in FIGS. 3-6, the frame or base 11 is supported by the feet 16, the feet 20 being adjusted such that their pad 21 is out of contact from the ground, for a purpose to be explained hereinafter.

Each of the uprights 14 and 15 supports an inertia flywheel, 22 and 23 respectively, on the end of a shaft, 24 and 25 respectively, the shaft 24 being journalled through the upright member 14 and the shaft 25 being journalled through the upright member 15. The shafts 24 and 25 are adjustable longitudinally and are coupled to the flywheels 22 and 23 by a conventional spline and longitudinal groove coupling, not shown, the portion of the shaft 24 or 25 projecting beyond its appropriate flywheel being protected by a cover as shown at 26.

An adjustable bulkhead or tailstock 28 is pivotally mounted transversely relative to the frame longitudinal member 12 between the uprights 14 and 15. The bulkhead 28 is a boxlike structure comprising a pair of substantially parallel end plates 30 and 32 interconnected by longitudinally extending spacer plates, such as shown at 34 and 35, FIG. 3, and 36, FIG. 4. An engine mount plate 38 on which is bolted an internal combustion engine 40 is rotatably supported from the bulkhead end plate 30, and a transmission support turret 42 is rotatably supported from the bulkhead end plate 32 for bolting thereon of a transmission to be tested, such as the transaxle transmission 44 schematically illustrated at FIGS. 1-2. The transmission support turret 42 comprises a rear annular plate 46, FIGS. 3-4, on the face of which is mounted a transmission adapter and support plate 48, by means of a plurality of sleeve spacers 50 through each of which is passed a mounting bolt, not shown, such that the transmission adapter and support plate 48 is removably mounted and interchangeable, a plurality of transmission adapter and support plates 48 being required to accommodate all the automatic transmissions presently on the market, conventional automatic transmissions for rear wheel drive motor vehicles as well as transaxle automatic transmissions for front wheel drive motor vehicles.

Figure 3:
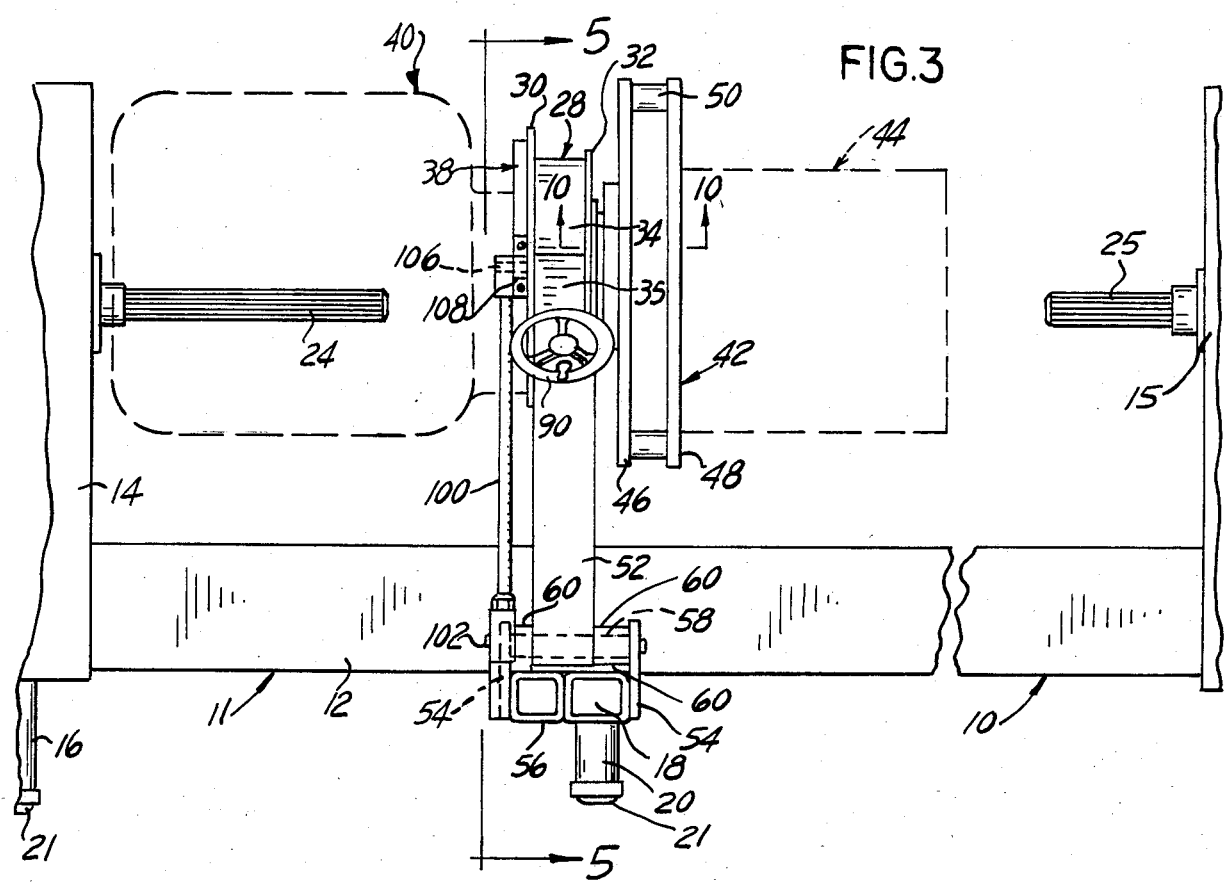
FIG. 3 is a partial front elevation view thereof.
Figure 4:
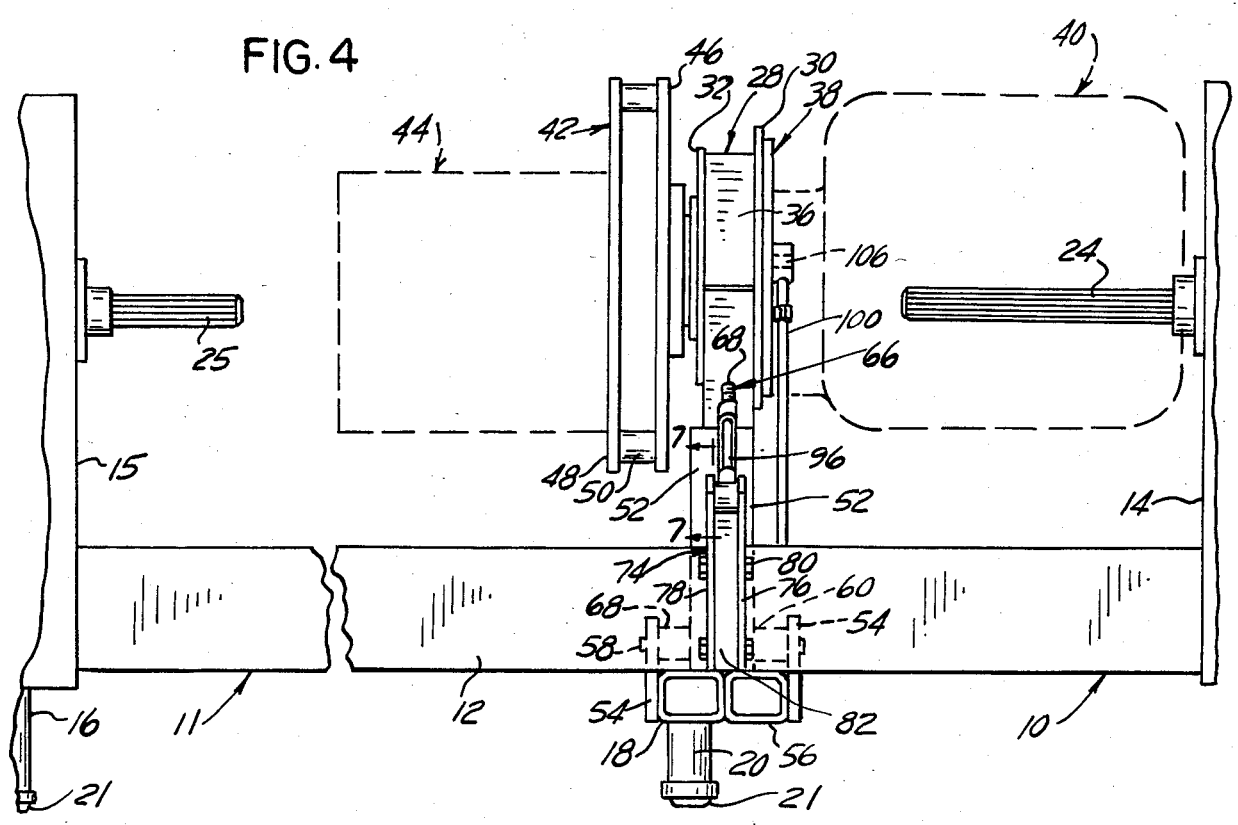
FIG. 4 is a partial rear elevation view thereof.

The bulkhead 28 is pivotally supported from the frame 11 of the apparatus 10 by means of a pedestal 52 welded at its top to the bottom of the bulkhead 28 and pivotally supported at its bottom by way of a pair of brackets 54, one welded or bolted on one side of the cross-beam 18, and the other welded or bolted on the outer surface of a reinforcing cross-beam 56, by way of a pivot pin 58 and spacers 60, FIG. 3, such that by proper inclination of the bulkhead 28 and rotation of the transmission support turret 42, the output shafts 61 and 62 of the transaxle transmission 44, FIG. 2, may be axially aligned with the flywheel shafts 24 and 25, respectively, for coupling thereto by the coupling means 63 and 64.

Figure 5:
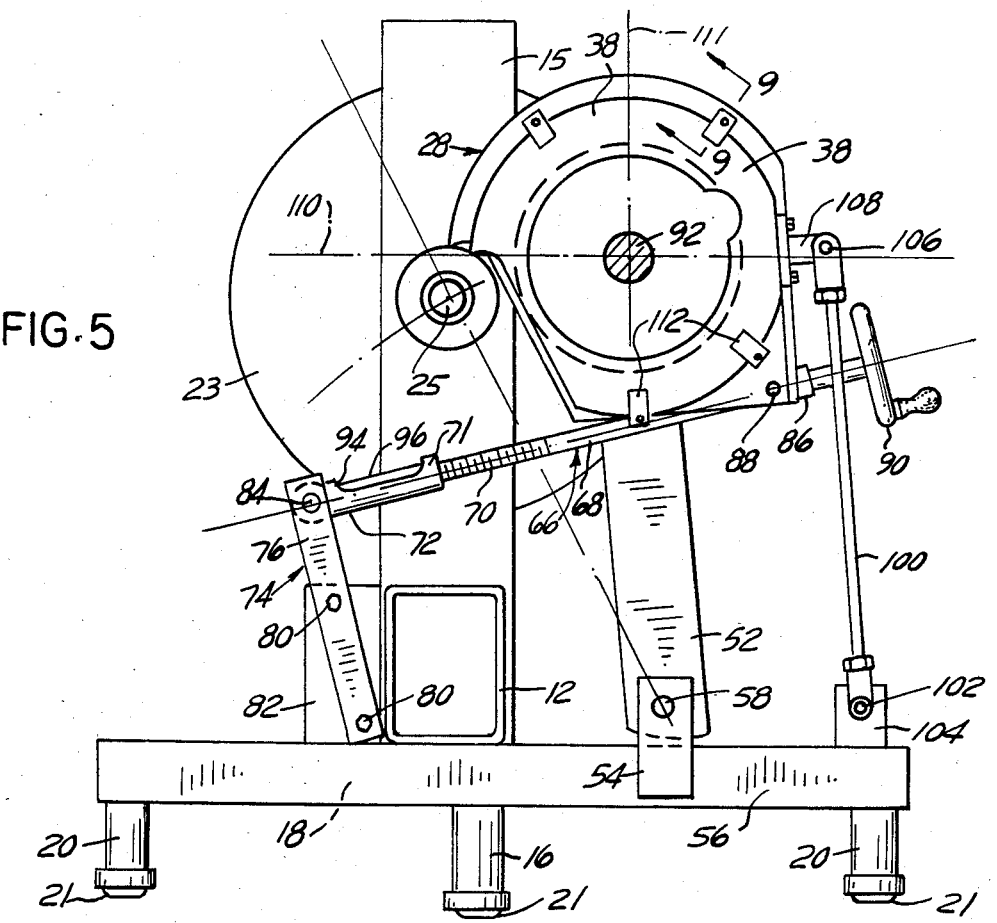
FIG. 5 is a section generally along line 5—5 of FIG. 3, with some elements omitted for the sake of clarity, showing the apparatus in use for testing a motor vehicle front wheel drive automatic transmission, or transaxle.
Figure 6:
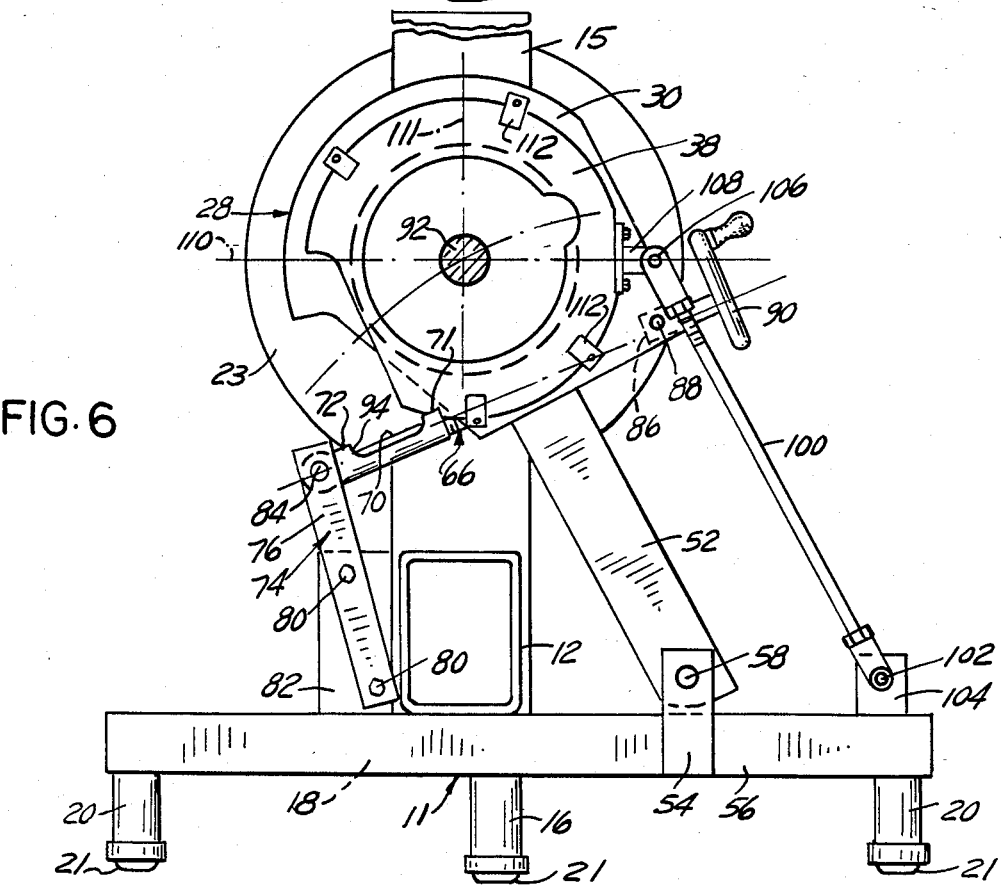
FIG. 6 is a view similar to FIG. 5 but showing the apparatus in use for testing a motor vehicle rear wheel drive automatic transmission.

Pivoting of the bulkhead 28 is effected by means of a jackscrew 66. As best shown at FIGS. 5-6, which omit illustrating the transmission support turret 42 for the sake of clarity and simplification, and at FIG. 7, the jackscrew 66 comprises a rotatable rod 68 having a threaded end 70 threading into an end 71 of a tubular member or sleeve 72 pivotally supported from a bracket 74. The bracket 74 is formed of two elongated plates 76 and 78 bolted as shown at 80, FIGS. 4-6, each on one side of a support and spacer plate 82 welded to the rear side of the longitudinal frame member 12 and to the top of the transverse beam or leg 18 and reinforcing transverse beam 56. The other end of the tubular member or sleeve 72 is pivotally attached by means of a pivot pin 84 between the plates 76 and 78 of the bracket 74. The other end of the rod 68 is rotatably supported by a thrust bearing 86 pivotally mounted as shown at 88, FIGS. 5-6, between the end plates 30 and 32 of the bulkhead 28. A crankwheel 90 is keyed on the end of the rod 68 so that by manual rotation of the crankwheel 90 in one direction the threaded end 70 of the rod 68 is threaded into the threaded end 71 of the tubular member or sleeve 72 for pivoting the bulkhead 28 from, for example, the position illustrated at FIG. 5 to the position illustrated at FIG. 6 wherein the output shaft 92 of the engine mounted on the engine mount plate 38 is axially aligned with the flywheel shaft 25. Rotation of the crankwheel 90 in an opposite direction pivots the bulkhead 28 from the position of FIG. 6, for example, to the position of FIG. 5, and to any intermediary position.

As best shown at FIG. 7, the tubular member or sleeve 72 of the screwjack 66 has a cut-out portion 94 enabling the test stand operator to manually introduce into, and remove from, the interior of the tubular member sleeve 72 one of a plurality of spacer cylinders 96. Each spacer cylinder 96 is appropriately designated for a type and model of motor vehicle transmission of the transaxle type such that when a spacer cylinder 96 is manually installed within the sleeve 72 and the rod 68 is rotated by means of the crankwheel 90 until the end of the rod threaded end portion 70 abuts against an end 97 of the spacer cylinder 96, the other end 97 of the spacer cylinder 96 being in abutment against the bottom 98 of the sleeve 72, the bulkhead 28 is in an appropriate inclined position permitting the operator, through rotation of the transmission support turret 42, FIG. 2, to align the transmission output shafts 61 and 62 with the flywheel shafts 25 and 24.

A strut 100 is disposed substantially parallel to the pedestal 52, and is pivotably connected at its lower end by way of a pin 102 to a bracket 104 welded to the top of the reinforcing transverse beam 56, FIGS. 3, 5 and 6. The other end of the strut 100 is pivotably attached, as shown at 106 to a bracket 108 fastened to the periphery of the engine support plate 38. A horizontal axis 110 passing through the center of the engine output shaft 92 passes also through the pivot axis of the pivot pin 106 at the upper end of the link 100, and the distance between the pivot pin 102 at the lower end of the link 100 and the pivot axis of the pin 106 being substantially equal to the distance between the pivot axis of the pivot pin 58 of the pedestal 52 and the longiudinal axis of the engine output shaft 92, the engine mounting plate 38 is caused to remain in the same angular position, irrespective of the position of the bulkhead 28, with the horizontal axis 110 and vertical axis 111 of the engine mount plate 38 remaining substantially and respectively horizontal and vertical throughout the displacement of the bulkhead 28. Consequently, an engine mounted on the engine mount plate 38 in a normal position for correct carburetion and proper lubrication remains in that normal and correct position irrespective of the position to which the bulkhead 28 is pivoted.

Any convenient means for mounting the engine support plate 38 rotatable relative to the bulkhead end plate 30 may be provided, as shown in further detail at FIG. 9. The engine support plate 38 is, for example, held against the surface of the bulkhead end plate 30 by way of L-shaped clamps 112 held each by a bolt 114 threading in a threaded hole 116 in the bulkhead end plate 30. Each L-shaped clamp 112 has a projecting portion 117 engaged over the front surface of the engine support plate 38 at the peripheral edge 118 thereof. The peripheral edge 118 of the engine mount or support plate 38 is circular over the majority of its perimeter and forms a bearing surface engaged with a recessed complementary bearing surface 120 on each clamp 112. The bulkhead end plate 30 is generally annularly shaped, thus forming an internal cylindrical surface, or circular way, 122 rollably engaged by rollers 124, three or four in number, disposed behind the engine support plate 38 and supported each by a pin 126. The engine support plate 38 is thus rotatably held relative to the bulkhead end plate 30, the bearing surfaces in engagement being the peripheral surface of the rollers 124 engaged with the circular way 122, of the bulkhead end plate 30, and the peripheral edge surface 118 of the engine support plate 38 in sliding engagement with the corresponding recessed lateral surface 120 of the clamp 112, sufficient clearance being provided below the head projecting portion 117 of the clamp 112 and the surface of the bulkhead end plate 30 to provide substantially playless and friction-free rotating motion of the engine support plate 38 relative to the bulkhead end plate 30, the surfaces in engagement being preferably coated with a thin film of tetrafluoroethylene.

As shown in detail at FIG. 10, the transmission support turret 42 comprises a transmission support and adapter plate 48 which is removably attached to a rear annular plate 46, appropriate sleeve spacers 50, through each of which passes a mounting bolt 128 removably holding the transmission support and adapter plate 48 a predetermined distance away from the annular rear plate 46. The rear annular plate 46 is rotatably supported relative to the bulkhead end plate 32 by way of a ring insert 130 welded, as shown at 132, over the edge of the central aperture 134 of the annular plate 46. A clamping ring 136 is disposed in the central aperture 134 of the annular plate 46 and is held from the bulkhead end plate 32 by means of appropriate bolts 138. The bolts 138 are passed through longitudinal bores 140 formed in an annular stepped housing 142 having a central longitudinal bore 143 in which is press-fitted a bearing bushing 144 supporting the driveshaft 92. The stepped annular housing 142 is fastened to the bulkhead end plate 32 by means of a plurality of bolts 145. The bolts 145 also fasten against the outer face of the bulkhead end plate 32 an annular support member 146 for a plurality of rollers 148, four in number for example, each rotatably mounted around the end of a pin 150, the other end of which is press-fitted in an appropriate bore in the roller support plate 146. The inner cylindrical surface 152 of the insert ring 130 is provided with a bearing bushing 154 having its peripheral surface 155 in engagement with the peripheral surface 156 of the stepped annular housing 142 provided with a thin film of polytetrafluoroethylene. Similarly, the lateral face of the ring insert 130 engaged with the clamping ring 136 has an annular bearing 158 having preferably a tetrafluoroethylene surface coating, and its other lateral face in engagement with the annular plate 146 is also provided with an annular bearing 160 having preferably a polytetrafluorethylene surface coating, all in order to reduce friction.

The turret 42 is thus rotatably supported by way of the rollers 148 and by way of the engagement of the inner surface 155 of the bearing bushing 154 with the peripheral surface 156 of the stepped bearing housing 142 and, when it is desired to hold the transmission turret support 42 in any angular position, the clamping ring 136 is tightened by means of the bolts 138.

Figure 11:
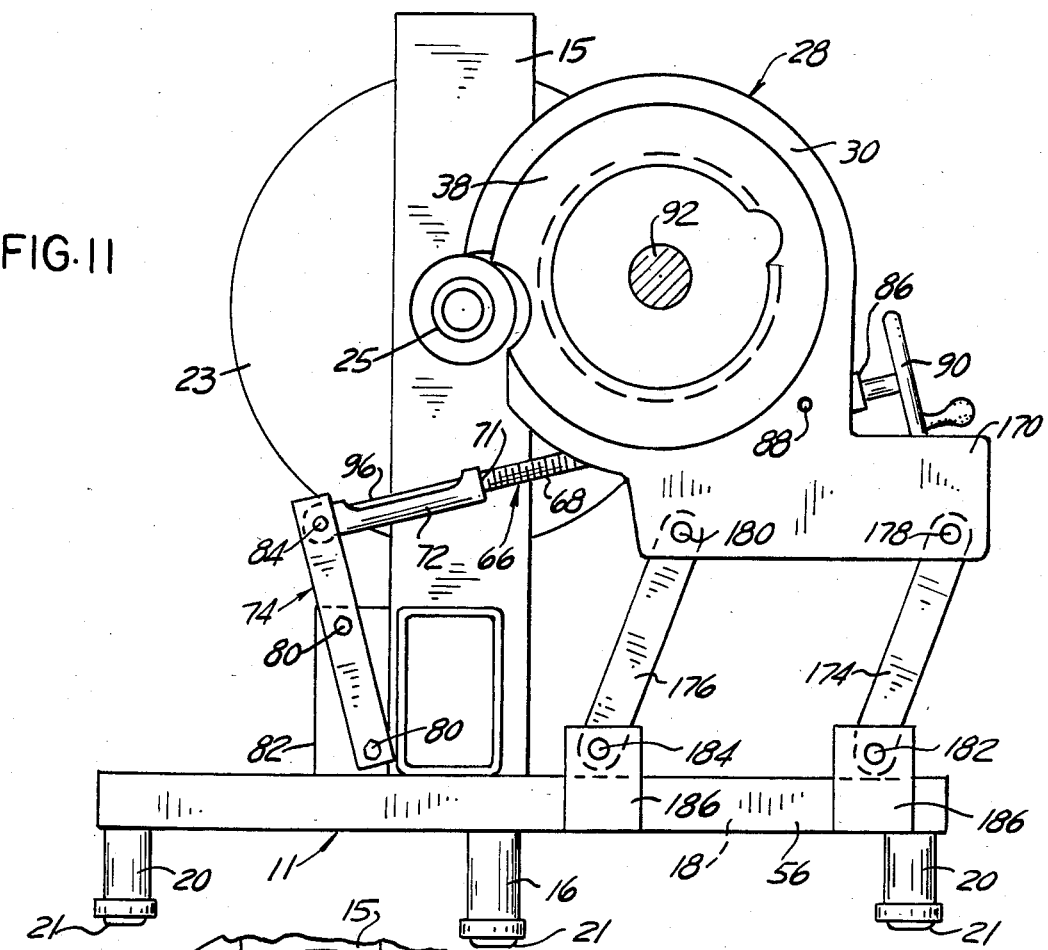
FIG. 11 is a view similar to FIG. 5 but showing a modification of the apparatus.
Figure 12:
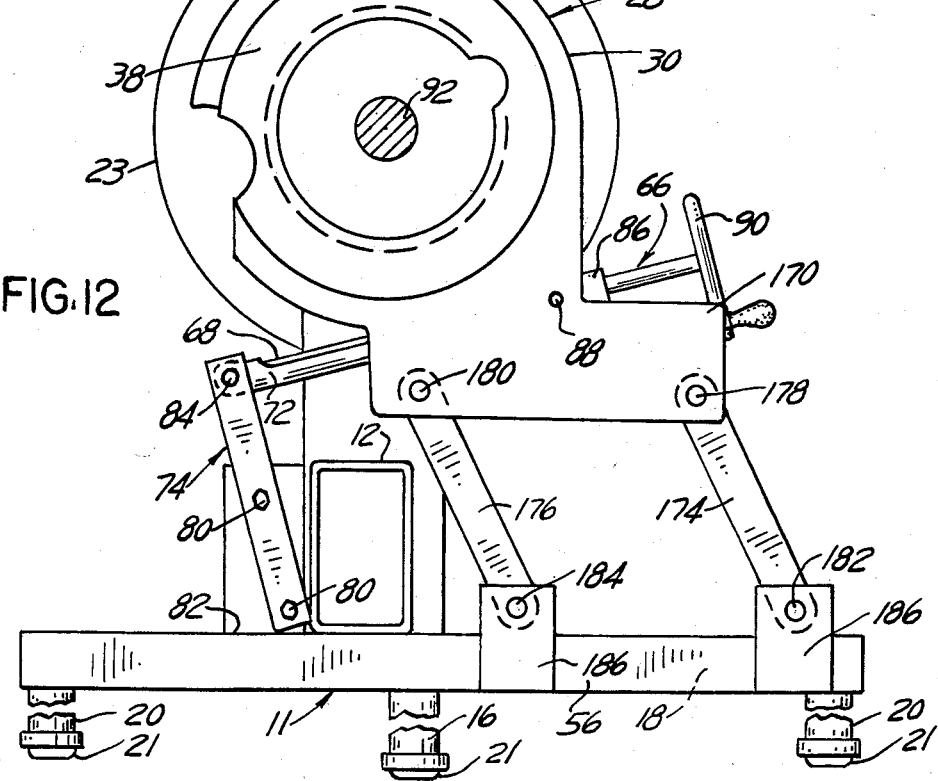
FIG. 12 is a view similar to FIG. 6 but showing the modification of FIG. 11.
Figure 13:
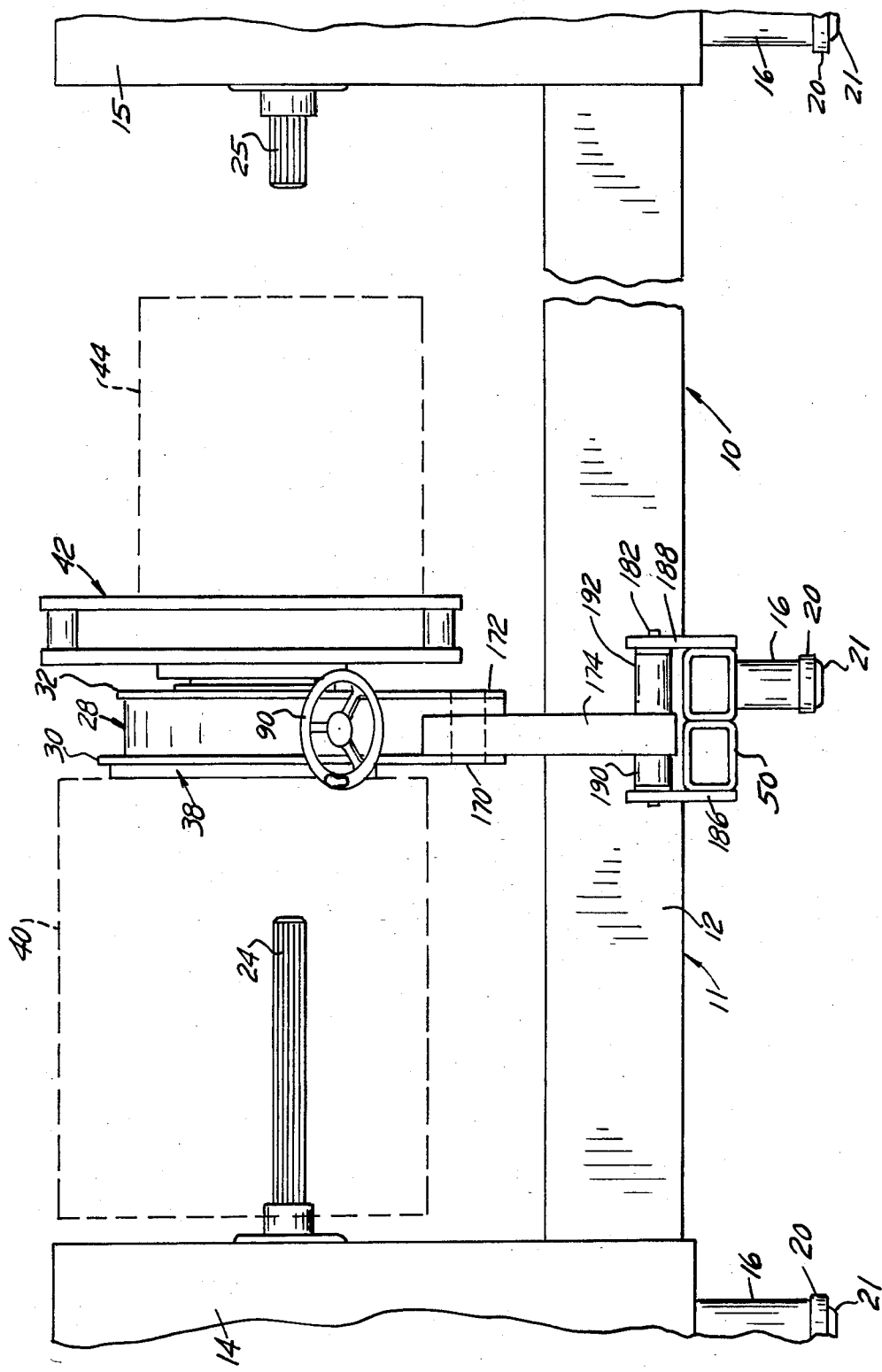
FIG. 13 is a partial front elevation view of the modification of FIGS. 11-12.

An alternate structure providing for maintaining the engine support plate 38 on the bulkhead 28 in the same position relative to the bulkhead irrespective of the lateral displacement of the bulkhead 28 is illustrated at FIGS. 11-13. In that structure, the bulkhead end plate 30 supporting the engine mounting plate 38 and the bulkhead end plate 32 supporting the transmission support turret 42 have a laterally projecting integral extension portion 170 and 172, respectively, between which are pivotally mounted a pair of parallel support legs 174 and 176 by way of, respectively, pins 178 and 180. The lower end of the legs 174 and 176 is pivotally mounted by way of pins 182 and 184 between two support brackets 186 and 188, FIG. 13, welded or bolted or otherwise fastened one on the exterior side of the reinforcing transverse beam 56 and the other one to the exterior surface of the transverse beam 18, appropriate spacer sleeves 190 and 192 being disposed around the pin 182 or 184 between the brackets 186 and 188 respectively and the side surface of the leg 174 and 176. In this manner, and because the distance between the pins 180 and 178 and 182 and 184, respectively, are substantially equal, the bulkhead 28 is supported by a deformable parallelogram as a result of which the bulkhead 28 and, consequently, the engine support plate 38 which may be solidly bolted to the bulkhead end plate 30 are maintained constantly in the same angular position irrespective of the amount of lateral displacement of the bulkhead 28 from, for example, the position illustrated at FIG. 11 to the position illustrated at FIG. 12, such displacement being effected by means of the screwjack 66, as previously explained.

It will be appreciated that the structure of the invention permits to test front-wheel transaxle automatic transmission by displacing the bulkhead 28 laterally to an appropriate position and rotating the transmission support turret 42 such as to align the output shafts of the transaxle transmission with the flywheel shafts 24 and 25, as well as testing conventional rear-wheel drive transmissions, generally by aligning the transmission output shaft with the flywheel shaft 25.

As previously indicated, the frame or base 11 of the apparatus 10 is generally supported from the ground by the end feet 16 and, by proper balancing laterally the frame or base 11 by appropriate ballasts, the lateral legs 20 may be such as to be out of contact with the ground while a transmission is being tested. Such an arrangement permits to observe visually the precise moment of gear shifting during acceleration and during deceleration which, as a result of causing a momentary change in the driving torque force, causes the frame 11 to oscillate in one direction or the other, engaging one of the lateral feet 20 momentarily with the ground.

Having thus described the present invention by way of a particular example of structure thereof, modification whereof will be apparent to those skilled in the art, what is claimed as new is as follows:

I claim:

1. A transmission testing apparatus comprising a support base, at least one upright member disposed at an end of said support base, a shaft journalled through said upright member, an inertia flywheel supported by said shaft for rotation thereby, an adjustably positionable bulkhead, an internal combustion engine mounted on one side of said bulkhead, said engine having an output shaft, a transmission support plate rotatably attached to said bulkhead for affixing thereto a transmission to be tested, said transmission having an output shaft and an input shaft aligned with the output shaft of said internal combustion engine for coupling to the output shaft of said internal combustion engine, means for displaceably and adjustably supporting said bulkhead relative to said support base for aligning the output shaft of said transmission with said shaft supporting said inertia flywheel, means for adjustably positioning said bulkhead, means for maintaining said engine in an angular position relative to horizontal and vertical axes that remains substantially constant irrespective of the position of said bulkhead, and means for coupling the output shaft of said transmission shaft to said shaft supporting said inertia flywheel.

2. The apparatus of claim 1 further comprising a second upright member disposed at the other end of said support base, said engine being mounted on said bulkhead between said bulkhead and said second upright member, a second shaft projecting from said second upright member, said second shaft being aligned with said shaft supporting said inertia flywheel, and means for coupling said second shaft projecting from said second upright member to a second output shaft of said transmission.

3. The apparatus of claim 2 wherein said means for adjustably positioning said bulkhead comprises a jackscrew.

4. The apparatus of claim 3 wherein said jackscrew comprises a rod having an end rotatably and pivotally attached to said bulkhead, means affixed at said end of said rod for manually rotating said rod, a threaded portion at the other end of said rod, a sleeve pivotally attached at an end to said support base, and an internal thread in the other end of said sleeve for engagement by said rod threaded end portion.

5. The apparatus of claim 4 wherein said sleeve has a cut-out portion and further comprising a removable and interchangeable spacer member disposed within said sleeve through said cut-out portion for limiting engagement of said rod threaded end portion into said sleeve.

6. The apparatus of claim 5 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

7. The apparatus of claim 4 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

8. The apparatus of claim 3 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

9. The apparatus of claim 2 wherein said second shaft projecting from said second upright member is rotatable, and further comprising a second inertia flywheel mounted on said second shaft projecting from said second upright member.

10. The apparatus of claim 3 wherein said means for adjustably positioning said bulkhead comprises a jackscrew.

11. The apparatus of claim 10 wherein said jackscrew comprises a rod having an end rotatably and pivotally attached to said bulkhead, means affixed at said end of said rod for manually rotating said rod, a threaded portion at the other end of said rod, a sleeve pivotally attached at an end to said support base, and an internal thread in the other end of said sleeve for engagement by said rod threaded end portion.

12. The apparatus of claim 11 wherein said sleeve has a cut-out portion and further comprising a removable and interchangeable spacer member disposed within said sleeve through said cut-out portion for limiting engagement of said rod threaded end portion into said sleeve.

13. The apparatus of claim 12 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

14. The apparatus of claim 11 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

15. The apparatus of claim 10 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

16. The apparatus of claim 9 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

17. The apparatus of claim 9 wherein said means for displaceably and adjustably supporting said bulkhead and said means for maintaining said engine in a substantially constant angular position comprise a pair of substantially parallel legs each having an end pivotally attached to said bulkhead and another end pivotally attached to said support base.

18. The apparatus of claim 17 wherein said means for adjustably positioning said bulkhead comprises a jackscrew.

19. The apparatus of claim 18 wherein said jackscrew comprises a rod having an end rotatably and pivotally attached to said bulkhead, means affixed at said end of said rod for manually rotating said rod, a threaded portion at the other end of said rod, a sleeve pivotally attached at an end to said support base and an internal thread in the other end of said sleeve for engagement by said rod threaded end portion.

20. The apparatus of claim 19 wherein said sleeve has a cut-out portion and further comprising a removable and interchangeable spacer member disposed within said sleeve through said cut-out portion for limiting engagement of said rodthreaded end portion into said sleeve.

21. The apparatus of claim 2 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

22. The apparatus of claim 2 wherein said means for displaceably and adjustably supporting said bulkhead and said means for maintaining said engine in a substantially constant angular position comprise a pair of substantially parallel legs each having an end pivotally attached to said bulkhead and another end pivotally attached to said support base.

23. The apparatus of claim 22 wherein said means for adjustably positioning said bulkhead comprises a jackscrew.

24. The apparatus of claim 23 wherein said jackscrew comprises a rod having an end rotatably and pivotally attached to said bulkhead, means affixed at said end of said rod for manually rotating said rod, a threaded portion at the other end of said rod, a sleeve pivotally attached at an end to said support base and an internal thread in the other end of said sleeve for engagement by said rod threaded end portion.

25. The apparatus of claim 24 wherein said sleeve has a cut-out portion and further comprising a removable and interchangeable spacer member disposed within said sleeve through said cut-out portion for limiting engagement of said rodthreaded end portion into said sleeve.

26. The apparatus of claim 1 wherein said means for adjustably positioning said bulkhead comprises a jackscrew.

27. The apparatus of claim 26 wherein said jackscrew comprises a rod having an end rotatably and pivotally attached to said bulkhead, means affixed at said end of said rod for manually rotating said rod, a threaded portion at the other end of said rod, a sleeve pivotally attached at an end to said support base, and an internal thread in the other end of said sleeve for engagement by said rod threaded end portion.

28. The apparatus of claim 27 wherein said sleeve has a cut-out portion and further comprising a removable and interchangeable spacer member disposed within said sleeve through said cut-out portion for limiting engagement of said rod threaded end portion into said sleeve.

29. The apparatus of claim 28 wherein said means for displaceably and adjustably support said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

30. The apparatus of claim 27 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

31. The apparatus of claim 26 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

32. The apparatus of claim 1 wherein said means for displaceably and adjustably supporting said bulkhead comprises a pedestal fastened at an end to said bulkhead and pivotally attached at the other end to said support base, and wherein said means for maintaining said engine in a substantially constant angular position comprises a plate rotatably supporting said engine from said bulkhead and a strut pivotally attached at one end to said support base and at the other end pivotally attached peripherally to said plate supporting said engine.

33. The apparatus of claim 1 wherein said means for displaceably and adjustably supporting said bulkhead and said means for maintaining said engine in a substantially constant angular position comprise a pair of substantially parallel legs each having an end pivotally attached to said bulkhead and another end pivotally attached to said support base.

34. The apparatus of claim 33 wherein said means for adjustably positioning said bulkhead comprises a jackscrew.

35. The apparatus of claim 34 wherein said jackscrew comprises a rod having an end rotatably and pivotally attached to said bulkhead, means affixed at said end of said rod for manually rotating said rod, a threaded portion at the other end of said rod, a sleeve pivotally attached at an end to said support base and an internal thread in the other end of said sleeve for engagement by said rod threaded end portion.

36. The apparatus of claim 35 wherein said sleeve has a cut-out portion and further comprising a removable and interchangeable spacer member disposed within said sleeve through said cut-out portion for limiting engagement of said rodthreaded end portion into said sleeve.

* * * * *

UNITED STATES PATENT AND TRADEMARK OFFICE
CERTIFICATE OF CORRECTION

PATENT NO. : 4,592,228

DATED : June 3, 1986

INVENTOR(S) : Carroll J. Lucia

It is certified that error appears in the above-identified patent and that said Letters Patent is hereby corrected as shown below:

Col. 10, line 42, change "support" to --supporting--.

Signed and Sealed this

Twenty-first Day of October, 1986

[SEAL]

*Attest:*

DONALD J. QUIGG

*Attesting Officer*     *Commissioner of Patents and Trademarks*